United States Patent [19]

Finnen et al.

[11] 3,928,788

[45] Dec. 23, 1975

[54] TAMPER PROOF WATTHOUR METER ENCLOSURE

[75] Inventors: Gerald W. Finnen, Raleigh; Herman Q. Wilson, Clayton, both of N.C.

[73] Assignee: Westinghouse Electric Corporation, Pittsburgh, Pa.

[22] Filed: July 3, 1974

[21] Appl. No.: 485,675

[52] U.S. Cl. ............... 317/111; 317/107; 324/156; 220/298
[51] Int. Cl.² ......................................... H02B 9/00
[58] Field of Search .......... 317/104, 105, 107, 111; 324/156; 339/113 R, 108 TP, 31 B, 31 T, 150 B, 151 B; 220/295, 298, 301, 300, 302, 304, 315, 322, 323, 324, 326, DIG. 20; 206/328

[56] References Cited
UNITED STATES PATENTS

| 1,969,499 | 8/1934 | Bradshaw | 317/107 |
| 2,895,637 | 7/1959 | Bakke | 317/104 |
| 3,628,096 | 12/1971 | Drew, Jr. | 317/107 |
| 3,846,677 | 11/1974 | Keever | 317/107 |

*Primary Examiner*—Gerald P. Tolin
*Attorney, Agent, or Firm*—R. W. Smith

[57] ABSTRACT

A locking clip arrangement includes a metal clip member assembled between the mating peripheral surfaces of a watthour meter cover and a meter base assembly for preventing unlocking rotation of the cover and forming a permanently locked watthour meter enclosure.

3 Claims, 11 Drawing Figures

TAMPER PROOF WATTHOUR METER ENCLOSURE

CROSS-REFERENCE TO RELATED APPLICATION AND PATENTS

This invention is related to application Ser. No. 377,847 for a Plastic Watthour Meter Cover Having An Indexed and Protected Front Face filed by Joseph M. Keever et al., July 9, 1973, which is a continuation application of application Ser. No. 260,638, filed June 7, 1972, now abandoned.

BACKGROUND OF THE INVENTION

The invention relates to tamper proof watthour meter enclosures for watthour meters and more particularly to a watthour meter enclosure having an improved locking clip arrangement for permanently locking a watthour meter cover to a base assembly.

DESCRIPTION OF THE PRIOR ART

Watthour meters of the type used for billing for electric power supplied to individual utility company customers are typically self-contained detachable meter units. These meter units include a removably pluggable base assembly and a cup-shaped cover that is normally releasably attached to the base assembly to form a two part watthour meter enclosure. The watthour meter enclosures are designed for protection during long use in different mounting environments and are further designed for prevention from tampering and unauthorized access to the meter movement contained in the enclosure. The cover, most commonly made of glass, and is attached to the base assembly by the meter manufacturer with a frangible sealing wire or strip as described in U.S. Pat. No. 2,914,354 issued Nov. 24, 1959. Other watthour meter sealing arrangements are described in U.S. Pat. Nos. 3,590,376 issued June 29, 1971 to Zeza et al, and U.S. Pat No. 3,628,096 issued Dec. 14, 1971 to Drew, Jr. both assigned to the assignee of this invention.

A watthour meter is usually mounted in a meter socket housing so it can be removed from the associated meter socket by simply breaking a further frangible seal provided by the utility company. It is relatively simple, therefore, to remove the meter unit for tampering of the meter movement to alter the meter movement operation and remount the meter to the socket to prevent or reduce proper billing registrations of the electric power consumed at the customer location. Due to sometimes long intervals between meter reading times and the sometimes difficulty of detecting that a meter sealing wire has been broken, it has been found in some instances that tampering of a watthour meter may be undetected for long time periods. Since the meter cover must be removed from the base assembly to gain access to the meter movement, it is desirable to permanently lock the cover to the base assembly of a watthour meter. The permanent locking of the enclosure is preferable after the meters have been delivered to a utility company rather than at the meter manufacturer so that it can be examined and/or tested prior to actual mounting at a customer's location.

In U.S. Patent application Ser. No. 377,847 filed July 9, 1973 by Keever et al. now U.S. Pat. No. 3,846,677 issued Nov. 5, 1974, which is a continuation of application Ser. No. 260,638 filed June 7, 1972, now abandoned, there is described a plastic watthour meter cover which is made of a high impact resistant plastic material which avoids the more easily broken glass meter covers. This plastic cover further prevents unauthorized access and tampering of the watthour meter movement due to the resistance of a plastic material cover to accidental or intentional breakage. Accordingly, it is further desirable to prevent access to watthour meters by providing a high security watthour meter enclosure which has a breakage resistant cover that is permanently locked to the base assembly so that actual destruction of the enclosure is required in order to gain access after it has been mounted at a customer's premises. The plastic cover described in the aforementioned application is assembled to the meter base assembly in a well known releasable locking relationship which may include a sealing wire or strip. Therefore, it is possible to remove the plastic cover at the customer's premises which is also true of other meter covers releasably locked to the meter base.

In U.S. Pat. No. 1,969,499 issued Aug. 7, 1934 to Bradshaw et al., a detachable watthour meter mounting is disclosed in which a cover is attached to a base assembly so as to prevent rotation of the cover relative to the base assembly for removal of the cover. Slots are provided around the inner periphery at the rear of the cover and a resilient locking strip is mounted on the meter base so that a free swinging end of the strip is positionable within one of the cover slots. Unlocking rotation of the cover relative to the base assembly is prevented by the strip end engaging the sides of the slot. A screw extends through the back of the base assembly and is externally rotatable for being threaded further into the base. The screw biases the locking strip into the cover slot. Accordingly, the screw is accessible to be reverse threaded to release the strip from the slot. In this arrangement, the screw head receives a sealing wire so that the cover is still removable from the base by breaking the seal as in the cover to base seals noted hereinabove. The present invention provides further protection of a watthour meter unit to further prevent tampering of the meter.

SUMMARY OF THE INVENTION

In accordance with the present invention a tamper proof watthour meter enclosure includes an improved locking clip arrangement at the mating surfaces between a cup-shaped watthour meter cover and a base assembly. Complementary shaped facing grooves are formed in the rear side surface of the cover mounting flange and in the front side surface of one of the attachment lugs of the base assembly. A clip member is made of an integral piece of thin resilient sheet metal material. The clip has a bottom portion for mounting within the base assembly groove and at least one arm projection extending from the bottom portion to extend into the cover groove. The end of the arm projection is positioned adjacent an abutment end of the cover groove to prevent detaching rotation of the cover for opening of the meter enclosure.

One feature of the present invention is to provide a tamper proof watthour meter enclosure having a cover and a base assembly which are permanently locked together by a separate locking clip positioned within a totally enclosed space formed by facing grooves in mating side radial surfaces of the cover and base assembly and the confined space is unaccessible to thereby prevent disassembly of the cover from the base assembly. Another feature of the present invention is to provide a separate locking clip that is easily placed in a groove of the base assembly and permits rotatable mounting of the cover to the base assembly attachment lugs by an arm projection of the clip that is resiliently depressed into the base groove. Upon the cover being positioned in a final mounting position on the base assembly, the arm projection is released to extend into the cover groove to thereby prevent detaching rotation of the cover on the attachment lugs. Another feature of this invention is to provide a locking clip arrangement which includes an integral locking clip having a flat bottom portion and an arm projection extending from the bottom portion and further including a tab portion extending from the bottom portion and receivable in a slot extending from the base assembly groove to further aid in retaining of the locking clip onto the base assembly prior to mounting of the cover to the base. Another feature of this invention is to provide a locking clip including a one-piece member having a pair of arm projections extending in opposite directions from a bottom portion so that ends of the projections are positioned in an adjacent relationship to opposite abutment ends of a cover groove facing a base assembly groove supporting the clip so as to lock the cover by preventing rotation in either of opposite directions. Other features and advantages of this invention will become apparent from the detailed description of the drawings briefly described hereinafter.

DESCRIPTION OF THE PREFERRED EMBODIMENTS

Figure 1:
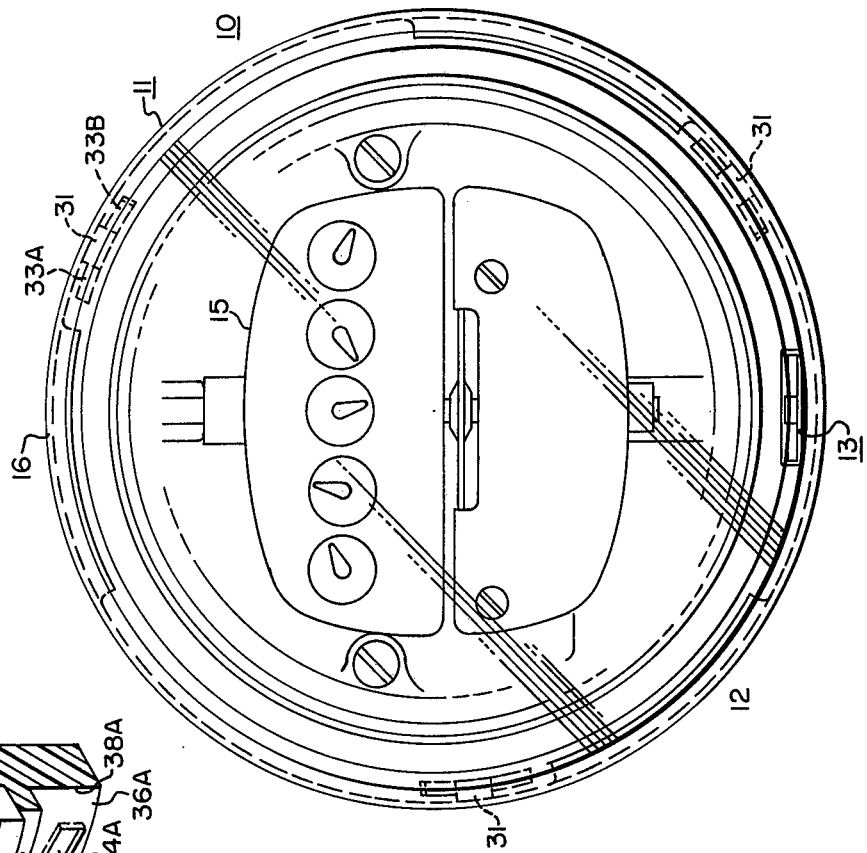
FIG. 1 is a front elevational view of a watthour meter unit including a tamper proof watthour meter enclosure having one embodiment of a locking clip arrangement made in accordance with this invention.
Figure 2:
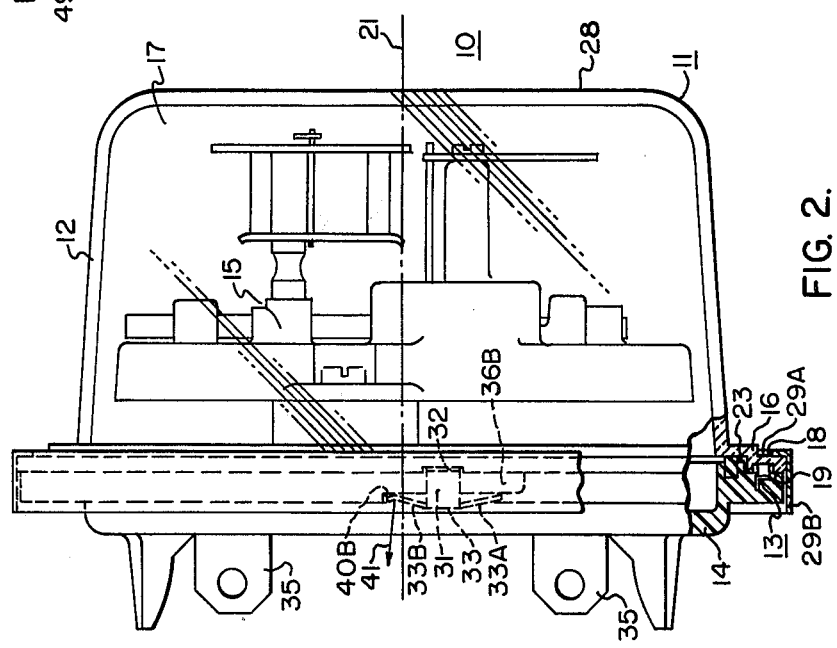
FIG. 2 is a side elevational view of the watthour meter shown in FIG. 1 with a bottom portion sectioned at the locking clip arrangement.

Referring now to the drawings and more particularly to FIGS. 1 and 2 there is illustrated a self-contained watthour meter unit 10 having a tamper proof enclosure 11 including a cover 12 and a locking clip arrangement 13 for permanently locking the cover 12 to a base assembly 14. A induction watthour meter movement 15 is carried by the base assembly 14 within the protected chamber formed by the meter enclosure 11. In one preferred embodiment, the arrangement 13 is included in an enclosure 11 including the plastic cover 12 and the base assembly 14 that are substantially identical to the corresponding cover and base assembly described in the aforementioned U.S. Pat. No. 3,846,677 issued Nov. 5, 1974, to Joseph M. Keever et al. which is a continuation of the application Ser. No. 260,368 filed June 7, 1972, now abandoned, both assigned to the assignee of this invention. It is to be understood that the present invention is not limited to the specific cover 12 and base assembly 14 disclosed herein and other known two part self-contained watthour meter enclosures may be made in accordance with the present invention. Enclosures of general detachable type of the enclosure 11 are mountable as a socket type in a meter socket housing, not shown, or in a bottom connected to socket base adapter assembly, also not shown.

The plastic cover 12 as described in the aforementioned U.S. Pat. No. 3,846,677 is made of a suitable molded plastic composition preferably of a polycarbonate plastic composition. The polycarbonate plastics are known to have high strength and impact resistance so as to be protected from either accidental or intentional breakage. The plastic composition further prevents tampering of the watthour meter movement by breaking of the watthour meter cover which is more easily broken when made of a glass cover composition. It is to be kept in mind, however, that the present invention is capable of being utilized with a meter cover having a glass composition as well as a plastic composition.

Figure 4:
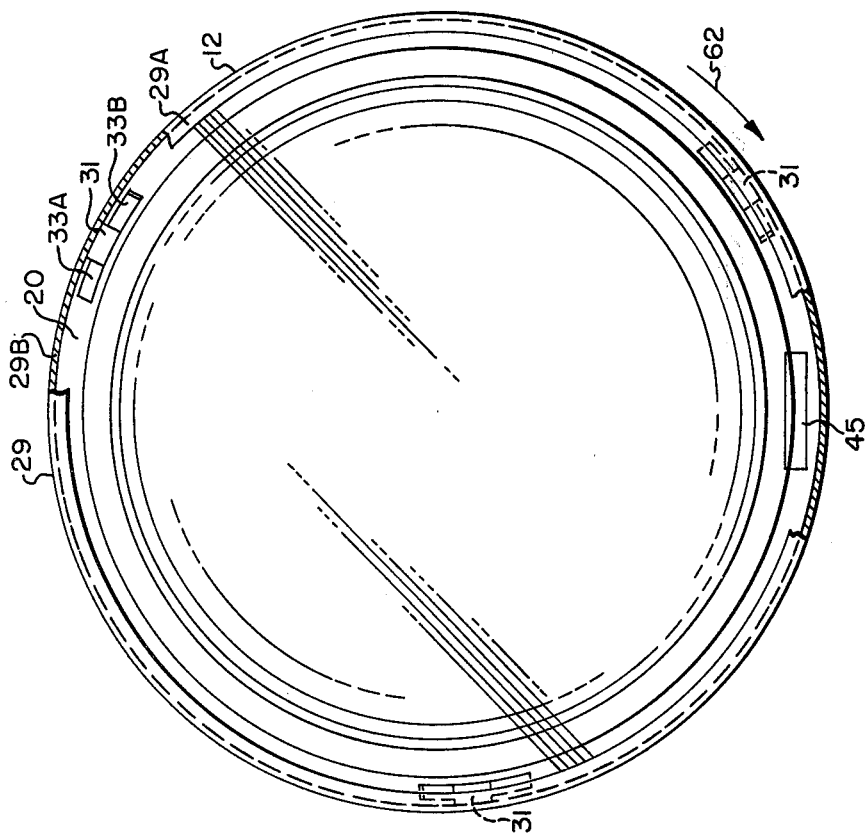
FIG. 4 is a front elevational view with parts broken away, of a cover separated from the watthour meter enclosure illustrated in FIG. 1.
Figure 5:
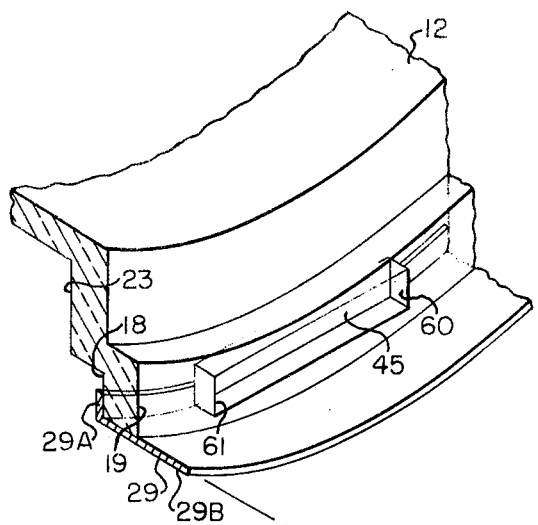
FIG. 5 is a fragmentary exploded view of the watthour meter enclosure illustrated in FIG. 1.

The details of the cover 12 and base assembly 14 are initially described hereinafter for a better understanding of this invention. The cover 12, as illustrated in FIGS. 2 and 4, has a cup-shaped configuration including a generally circular cross section. A circular mounting flange 16 extends radially outward to define the outer periphery at the rear open end of the cover 12. When the cover 12 is attached at the flange 16 to the base assembly 14, the enclosure 11 forms a protective chamber 17 within the inner surfaces of the cover and base assembly. Front and rear side radial surfaces 18 and 19 of the mounting flange 16 are substantially flat and extend substantially perpendicular to a center longitudinal axis 12 of the enclosure 11 and of the cover 12. The rear flange side surface 19 is stepped forward, as best seen in FIG. 5, along an inner radius to form an annular axially offset shoulder 23. A suitable sealing ring 24 provides a tight seal between the shoulder 23 and an annular projecting lip 26 of the base assembly 14. Any equivalent cover to base assembly seal may be used such as described in U.S. Pat. Nos. 3,590,376 and 3,628,096 both assigned to the assignee of this invention.

The closed end of the cover 12 includes a front face 28 which is transparent as is the composition forming the cover 12 for viewing the dial plates of the watthour meter movement 15. A series of circumferentially spaced index lugs and knurled lugs, not shown, extend around the front face of the front of the cover in the preferred embodiment of the watthour meter cover described and claimed in the aforementioned U.S. Pat. No. 3,846,677. A metal locking rim 29 has a configuration as described in the aforementioned application having a forward bent end radially inward to define a narrow flange 29A which fits over the forward side surface 18 of the cover flange 16 as shown in FIGS. 2 and 5. A cylindrical body 29B of the rim 29 covers the outer peripheral edge of the cover mounting flange 16 and further extends axially rearward so as to overlap the outer peripheral edge of the base assembly 14.

A series of three locking tabs 31 shown in broken lines in FIG. 1 and are also described more fully in the aforementioned application. The locking tabs are spot welded to the inner wall of the rim body 29B to provide fixed clamping attachment of the cover mounting flange 16 to the base assembly 14. The locking tabs 31 have a generally U-shaped side cross-sectional configuration, not shown, having an inner leg 32 of each tab positioned against the rear side surface 19 of the cover flange 16 as shown in FIG. 2. An outer leg 33 of the locking tabs 31 is spaced axially rearward of the rear side surface of the cover flange 16 and includes resilient wing projections 33A and 33B.

Figure 3:
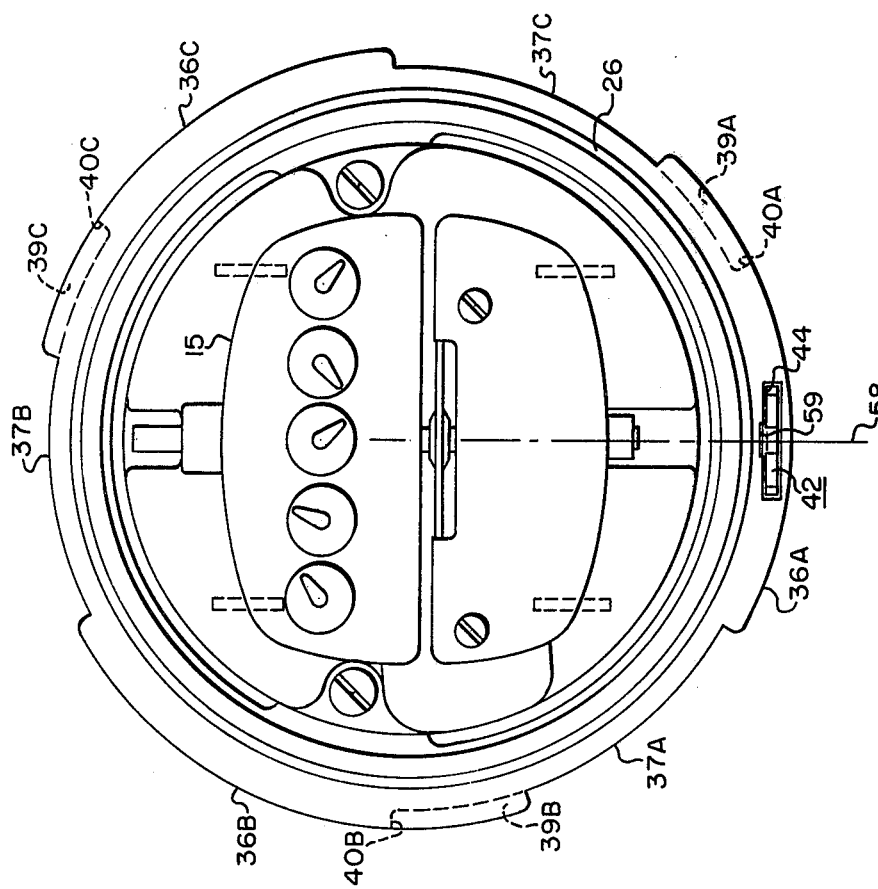
FIG. 3 is a front elevational view of a base assembly separated from the watthour meter enclosure illustrated in FIG. 1.

The base assembly 14 is shown in FIGS. 2 and 3 supporting the meter movement 15 which includes contact blades 35 which extend through the rear of the base 14 for engagement with jaw contacts, not shown, of a socket or adapter receiving the watthour meter unit 10. Arcuate attachment lugs 36A, 36B, and 36C extend radially outward at the outer periphery of the base assembly 14 and define notch spaces 37A, 37B, and 37C therebetween.

The attachment lugs 36A, 36B and 36C have front side radial surfaces, for example, the front surface 38A of the lug 36A is partially shown in FIGS. 5, 6, 7, 8, 9, 10 and 11, which extend substantially perpendicular to the center axis 21. The front side radial surfaces of the lugs 36A, 36B and 36C form flat mating surfaces with the rear side surface 19 of the cover mounting flange 16. The spaces 37A, 37B and 37C permit tab wing projections 33A and 33B of each of the locking tabs 31 to extend behind attachment lugs so that the winged projections 33A and 33B slide onto rear camming surfaces 39A, 39B and 39C at the rear of the lugs 36A, 36B and 36C respectively. Rotational locking mounting of the cover 12 requires a clockwise direction of the cover relative to the base assembly as viewed in FIG. 1. The camming surfaces 39A, 39B and 39C are formed by arcuate and tapered slots each having a closed end 40A, 40B and 40C respectively, and extending arcuately along the rear outer periphery of the arcuate attachment lugs 36A, 36B and 36C. An open slot end of each of the camming surfaces is located at the most counter-clockwise edge of the arcuate attachment lugs. As shown in FIG. 1, one of the locking tabs 31 on the lug 36B has the tip end of the tab wing projection 33B engaging the end 40B of the camming surface 39B. This seats the locking tabs 31 so that the cover 12 is in the final mounting position as shown in FIG. 1. It is noted that the wing projections 33B of the locking tabs 31 can be pried and bent axially rearward as indicated by the directional arrow 41 in FIG. 2. This releases the projections from the slot ends 40A, 40B and 40C so that the cover can be rotated further clockwise until the tabs 31 slide off of the attachment lugs 36A, 36B and 36C when the locking arrangement 13 is not used. The cover is then free to be removed.

Figure 7:
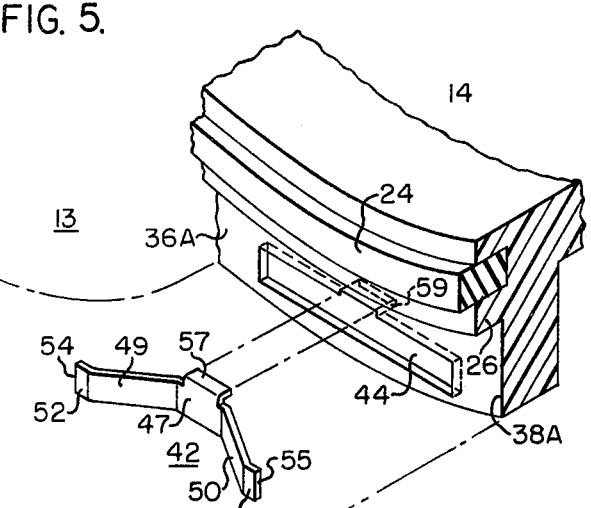
FIG. 7 is a view corresponding to FIG. 6 in which the parts are illustrated in a different operative relationship.
Figure 7:
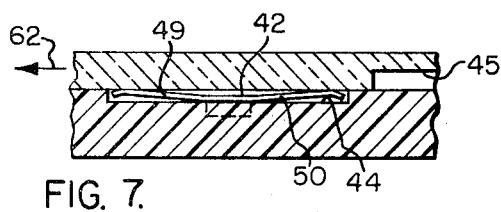
Figure 6:
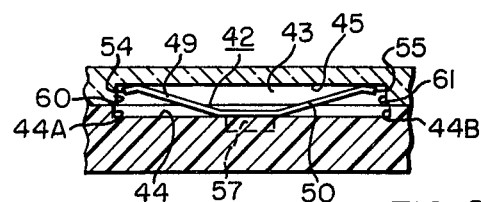
FIG. 6 is an enlarged sectional view of FIG. 1 taken along the axis VI—VI and looking in the direction of the arrows.

Referring now in particular detail to the improved tamper proof watthour meter enclosure 11 including the locking clip arrangement 13, a separate locking clip 42 is shown in FIGS. 1, 2 and 6, assembled in a confined space 43 formed at the outer peripheries of the cover 12 and base 14 by facing grooves 44 and 45 in the base assembly 14 and cover 12 respectively, as best seen in FIG. 5. The groove space is the space between the groove edges and below the surfaces in which the grooves 44 and 45 are formed. A front plane view of the base assembly goove 44 is shown in FIG. 3 and a front plane view of the cover groove 45 is shown in FIG. 4 when a generally rectangular outline is shown for both grooves. The perspective view of the locking clip 42 shown in the exploded view of FIG. 5 illustrates a one-piece clip member formed of a thin resilient sheet metal material. The clip 42 is preferably stamped from a stainless steel sheet stock having a thickness of about 0.025 inch. A flat bottom portion 47 of the clip has an elongated generally rectangular configuration and extends to oppositely disposed arm projections 49 and 50. The projections 49 and 50 extend at substantially equal angles forward from the bottom 47. The arm projections terminate at bent end portions 52 and 53 which are bent away from each other so as to extend slightly downward toward the bottom portion 47. This places straight terminating end edges 54 and 55 of the ends 52 and 53, respectively, so they are below the bends of the ends 52 and 53. This prevents the sharp corners of the edges from cutting into and binding on the rear side surface 19 of the cover 12 as it slides over the clip 42 as shown in FIG. 7. The free ends 52 and 53 project in an offset cantilevered fashion at a predetermined distance from the clip bottom portion 47. The bottom portion 47 further includes an integral tab 57 extending at right angles rearwardly as viewed in FIG. 5 from one side of the bottom portion 47.

FIGS. 3 and 5 show the groove 44 formed in the bottom arcuate attachment lug 36A in the front side surface 38A thereof. The peripheral outline of the groove 44 is substantially rectangular and is slightly larger than the top outline of the clip 42 as viewed in FIG. 3. The bottom of the groove 44 is substantially flat and parallel to the lug front surface 38A. The depth of the groove is sufficient to wholly receive the projections 49 and 50 when the cover is mounted on the base assembly as shown in FIG. 7. In one embodiment as shown in FIG. 3 the groove 44 is centered with respect to a vertical center axis 58 of the base assembly 14. Integral with the groove 44 is a slot 59 having a width and depth slightly larger than width and length of the tab 57 to extend further rearward into the front surface 38A attachment lug 36A than does the bottom of the groove 44. As shown in FIGS. 6 and 7, the slot 59 receives the clip tab 57 when the bottom 47 rests flush with the bottom of the groove 44. As is seen, the ends 44A and 44B of the groove 44 are slightly longer than the distance between the end edges 54 and 55 of the clip 42 when they are depressed in a downward swinging fashion into the groove space of groove 44.

The substantially rectangular groove 45 in the cover 12 is shown in FIGS. 4, 5 and 6 and it is noted that the abutment ends 60 and 61 are substantially the same distance apart as are the ends of the base assembly groove 44. It is important that the groove ends 60 and 61 terminate slightly spaced from the clip end edges 54 and 55 so that they form stop surfaces for engagement by the clip end edges 54 and 55 to prevent rotation of the cover 12 in opposite directions on the base assembly 14. The tab 57 is forced against the sides of the slot 59 in reaction to forcing of the groove ends 60 and 61 against the arm projections 49 and 50.

In FIG. 7 is shown an intermediate operative position of the clip arrangement 13 as the cover 12 is being rotatably mounted on the attachment lugs of the base assembly 14. As the cover groove 45 approaches the base assembly groove 44, upon clockwise rotation of the cover 12 as shown by directional arrow 62 in FIG. 7, the cover rear side surface 19, flange 16 depresses the resilient arm projections 49 and 50 so that they are below the front side surface of the base assembly 14. As the cover 12 continues to be rotated, it is seen that the resiliency of the material of the clip 42 will return the arm projections to the positions shown in FIG. 6 when the groove 45 is aligned with the groove 44 and the cover 12 is in the final mounting position with the locking tabs 31 engaging the ends 40A, 40B and 40C of the lug camming surfaces. Accordingly, the cover 12 will be permanently locked in place on the base assembly 14. This is due to the fact that rotation of a cover in either direction will be prevented by the groove abutment ends 60 and 61 engaging the clip end edges 54 and 55. This prevents clockwise rotation of the cover 12 even if the wing projections 33B of the cover rim locking tabs 31 are bent back to be released from ends 40A, 40B and 40C of the base assembly camming surfaces.

The clip 42 is confined within the space 43 with the arm projections biased slightly by engagement with the bottom of the cover groove 45, as shown in FIG. 6. The space 43 is inaccessible even upon removing the watthour meter unit 10 from an associated socket. The cover groove 45 may be formed so as to extend to the outer peripheral edge of the rear side surface 19 of the cover mounting flange 16 and still maintain the clip 42 in a confined space 43 since the locking rim 29 encloses the outer peripheral boundaries of the cover 12 and base assembly 14 as shown in FIG. 5.

Figure 8:
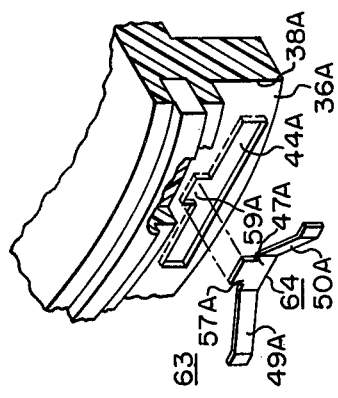
FIG. 8 is a fragmentary exploded view of an alternative embodiment of a locking clip arrangement for a watthour meter enclosure made in accordance with this invention.

FIG. 8 illustrates an alternative embodiment of a locking clip arrangement 63 for replacing the arrangement 13 in accordance with this invention. An alternate locking clip 64 has a bottom portion 47A and arm projections 49A and 50A which are substantially identical in size and configuration to the corresponding bottom 47 and arm projections 49 and 50 of the clip 42. A rectangular tab 57A having substantially the same size as the tab 57 extends in a substantially coplanar relationship with the clip bottom 47A.

In the arrangement 63, the cover 12 with the groove 45 is used as described above in FIG. 8 is shown a base assembly groove 44A in the attachment lug 36A which is oriented therein in the centered position as is the groove 44 shown in FIG. 3. A groove slot 59A replaces the groove slot 59 so as to be formed as a side extension of the groove 44A having the same depth in the attachment lug front surface 38A as the remaining main portion of the groove 44A has with a rectangular size for receiving the tab 57A of the clip 64. The locking clip 64 is placed in the base assembly groove 44A and the cover 12 is mounted for permanent locking as described for the locking clip arrangement 13 hereinabove.

Figure 9:
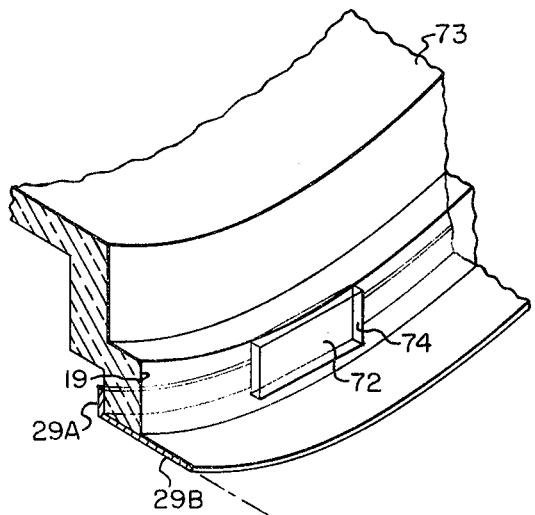
FIG. 9 is a fragmentary exploded view corresponding to FIG. 5 illustrating another alternative embodiment of a locking clip arrangement for a watthour meter enclosure made in accordance with this invention.
Figure 11:
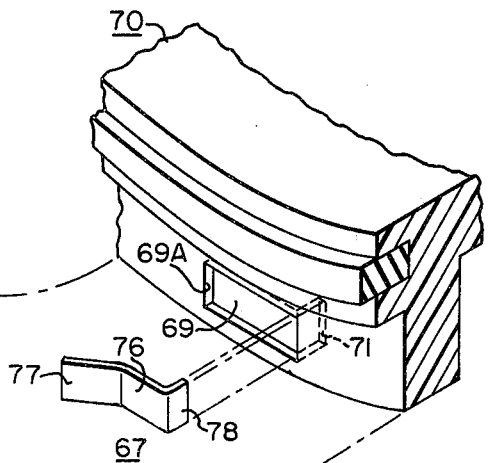
FIG. 11 is a view corresponding to FIG. 10 in which the parts are illustrated in a different operative relationship.
Figure 11:
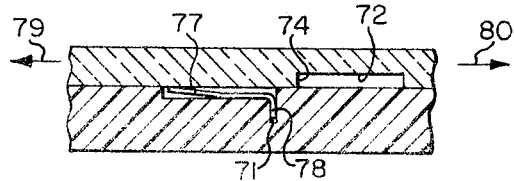
Figure 10:
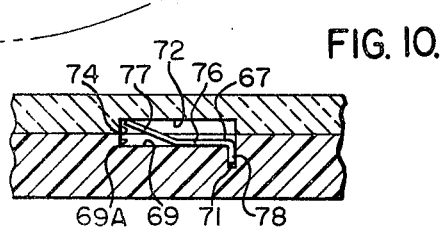
FIG. 10 is a fragmentary sectional view corresponding to FIG. 6 illustrating the locking clip arrangement illustrated in FIG. 9.

FIGS. 9, 10 and 11 show a further alternative embodiment of a locking clip arrangement 66 including a locking clip 67 shown separately in perspective in the exploded view of FIG. 9. An elongated substantially rectangular groove 69 is provided in the base assembly attachment lug 36A of a base assembly 70 corresponding to the assembly 14 and is positioned in substantially the same centered relationship as described for the grooves 44 and 44A. The groove 69 has an axially rearwardly extending slot 71 at the right hand end of the groove 69 as viewed in FIGS. 9, 10 and 11 which is the most clockwise end of the groove 69. A groove 72 is formed in the cover rear side surface 19 of a cover 73 corresponding to the cover 12 having substantially the same groove width as the base groove 69. An abutment end 74 of the groove 69 is substantially coaligned with the base groove end 69A and the groove 72 extends counter clockwise substantially the same distance as does the groove 69.

The locking clip 67 is made of the same sheet metal material as described for the clip 42 and is stamped in a substantially rectangular shape to include a bottom portion 76 and a single arm projection 77 extending forwardly at a predetermined angle from one end thereof. A tab portion 78 is bent rearwardly from the opposite end of the bottom portion to extend at substantially a right angle thereto. As shown in FIGS. 10 and 11 the bottom portion 76 rests on the flat bottom of groove 72 and the tab 78 is positioned in the slot 71 to retain the clip 67 in place prior to and upon mounting of the cover 73 onto the base assembly 70 when rotated clockwise in the direction of directional arrow 79. Counter clockwise unlocking rotation of the cover 73 in the direction of the directional arrow 80 is prevented by the end edge 77A of the clip projection 77 engaging the cover groove abutment end 74 to thereby permanently lock the cover and base assembly together. Rotation of the cover 12 in the clockwise direction of arrow 79 is prevented by the finally mounted and assembled positions of the cover and base assembly wherein the locking tabs 31 shown in FIGS. 1 and 2 engage the slot ends 40A, 40B and 40C of the camming surfaces in the rear side surfaces of the base attachment lugs. The locking clip arrangement 66 is equally effective to permanently lock the watthour meter cover 73 and base assembly 70 when there is no possibility of the cover being rotated clockwise.

Other modifications of permanently lockable tamper proof watthour meter enclosures may be made to the preferred forms of this invention as described hereinabove without departing from the spirit and scope of our invention.

We claim as our invention:

1. A tamper proof watthour meter enclosure comprising:
   a base assembly supporting a watthour meter movement, said assembly including circularly arcuate attachment lugs extending radially at the outer periphery thereof in spaced apart relationship, said attachment lugs having forward and rear side radial surfaces thereon;
   a cup-shaped cover including a closed forward end and an open rear end, said cover further including a circular mounting flange extending radially outward at said rear open end, with a rear radial side surface mating with said front radial side surfaces of said attachment lugs, said cover further including a locking rim carrying tab members rotationally attaching and locking said cover to said attachment lugs to enclose said watthour meter movement within a protective enclosure chamber; and
a permanent locking arrangement including a clip member, a first groove formed in the front side surface of one of said attachment lugs, a second groove formed in said rear side surface of said mounting flange of said cover, a slot extends from the side of said first groove, said second groove being in a facing relationship with said first groove, said first and second grooves and said slot defining an enclosed space wholly containing said clip member, said clip member being made of an integral piece of resilient sheet material and including a substantially flat elongated bottom portion supported on the bottom of said first groove, a tab extending from said bottom portion and into said slot and an arm projection extending at a predetermined angle from said bottom portion and terminating at a free edge, said bottom portion being supported on the bottom of the base assembly groove such that said free edge of said arm projection is positioned in alignment with an abutment end of the cover groove and engageable therewith to oppose movement of said cover in an opposite direction to said one direction, and said arm projection being resiliently depressible by said rear side surface of said cover into the space of said first groove during rotational attachment of said cover to said base assembly so as to thereafter resiliently return to the locking position within the space of said second groove upon said grooves being mutually aligned in the facing relationship.

2. The tamper proof watthour meter as claimed in claim 1 wherein the tab portion extends at a substantially right angle to the bottom portion and away from the extending direction of the arm projection, and wherein the slot has a shape complementary to the shape of the tab and extends further into said base assembly than the base assembly groove so that the sides of the slot substantially wholly receive the tab portion in close juxtaposition relationship.

3. The tamper proof watthour meter enclosure as claimed in claim 1 wherein the locking clip includes a second arm projection so that the clip has a pair of oppositely disposed arm projections extending from opposite ends of said bottom portion and wherein the tab portion extends from one side of the bottom portion and said pair of arm projections terminate at free edges in alignment with opposite abutment ends of the second groove and being engageable therewith to oppose unlocking rotation of said cover in either of the one and the opposite directions.

* * * * *